United States Patent
Al Ahmad et al.

(10) Patent No.: US 10,805,030 B1
(45) Date of Patent: Oct. 13, 2020

(54) WIRELESS MULTIPLEXING USING TUNABLE ANTENNA

(71) Applicant: UNITED ARAB EMIRATES UNIVERSITY, Al Ain (AE)

(72) Inventors: Mahmoud Al Ahmad, Al Ain (AE); Mohammed Adib Ali Obaid, Al Ain (AE)

(73) Assignee: UNITED ARAB EMIRATES UNIVERSITY, Al Ain (AE)

( * ) Notice: Subject to any disclaimer, the term of this patent is extended or adjusted under 35 U.S.C. 154(b) by 0 days.

(21) Appl. No.: 16/542,245

(22) Filed: Aug. 15, 2019

(51) Int. Cl.
*H04B 1/00* (2006.01)
*H04J 1/04* (2006.01)
*H04B 7/185* (2006.01)
*H01Q 23/00* (2006.01)

(52) U.S. Cl.
CPC .............. *H04J 1/04* (2013.01); *H01Q 23/00* (2013.01); *H04B 7/18515* (2013.01)

(58) Field of Classification Search
None
See application file for complete search history.

(56) References Cited

U.S. PATENT DOCUMENTS

| | | | |
|---|---|---|---|
| 4,849,750 A | | 7/1989 | Andros et al. |
| 5,699,054 A | * | 12/1997 | Duckworth ............ G08C 17/02 340/13.24 |
| 9,685,996 B1 | * | 6/2017 | Thoen ................ G06K 7/10336 |
| 2016/0049965 A1 | * | 2/2016 | Khlat .................. H04B 1/0064 370/297 |

FOREIGN PATENT DOCUMENTS

| | | |
|---|---|---|
| CN | 106099372 A | 11/2016 |
| CN | 205723959 U | 11/2016 |

OTHER PUBLICATIONS

Yousefbeiki et al., "Towards Compact and Frequency Tunable Antenna Solutions for MIMO Transmission with a Single RF Chain", IEEE Transactions on Antennas and Propagation (2014), vol. 62, Iss. 3, pp. 1-9.

\* cited by examiner

*Primary Examiner* — Mansour Oveissi
(74) *Attorney, Agent, or Firm* — Nath, Goldberg & Meyer; Richard C. Litman

(57) ABSTRACT

The wireless multiplexing using a tunable antenna provides a signal multiplexing technique that uses an electronically tunable antenna having a resonant frequency adjusted by tuning. An antenna tuning driver controls tuning of the tunable antenna and a signal selection circuit communicates signals selected in accordance with the antenna tuning driver, wherein the selection of the signals provides multiplexing. The technique allows separate communication with a set of stations operating at different communication frequencies as different communication links.

6 Claims, 4 Drawing Sheets

WIRELESS MULTIPLEXING USING TUNABLE ANTENNA

BACKGROUND

1. Field

The disclosure of the present patent application relates to wireless communications methods, and particularly to a system and method for wireless multiplexing using a tunable antenna for radio frequency (RF) communications.

2. Description of the Related Art

The steady growth and increment in communication services and applications calls for the implementation and utilization of dynamic and reconfigurable communication approaches. Agile-based frequency reconfiguration should be considered. For frequency reconfiguration, tunable antennas have been developed with a capability of adjusting transmit and receive frequencies-characteristics.

Thus, wireless multiplexing using a tunable antenna solving the aforementioned problems is desired.

SUMMARY

The wireless multiplexing using a tunable antenna provides a signal multiplexing system and technique that uses an electronically tunable antenna having a resonant frequency and key antenna parameters that can be adjusted by tuning. An antenna tuning driver controls tuning of the tunable antenna, and a signal selection circuit communicates signals selected in accordance with the antenna tuning driver, wherein the selection of the signals provides multiplexing.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The disclosed technology relates to antenna tuning in RF communications. More specifically, the disclosed subject matter implements a method of multiplexing multiple inputs using a tunable antenna. The antenna's frequency characteristics are switched by applying a tuning action, such as voltage or mechanical tuning. This allows the receiver connected to the tunable antenna to be used as a multiplexing device that can collect signals from different surrounding antennas; each surrounding antenna operating at a fixed frequency. The tunable antenna can switch its frequency characteristics with high speed to cover a wide spectrum of surrounding antennas to form a multiplexing communication link.

Figure 1:
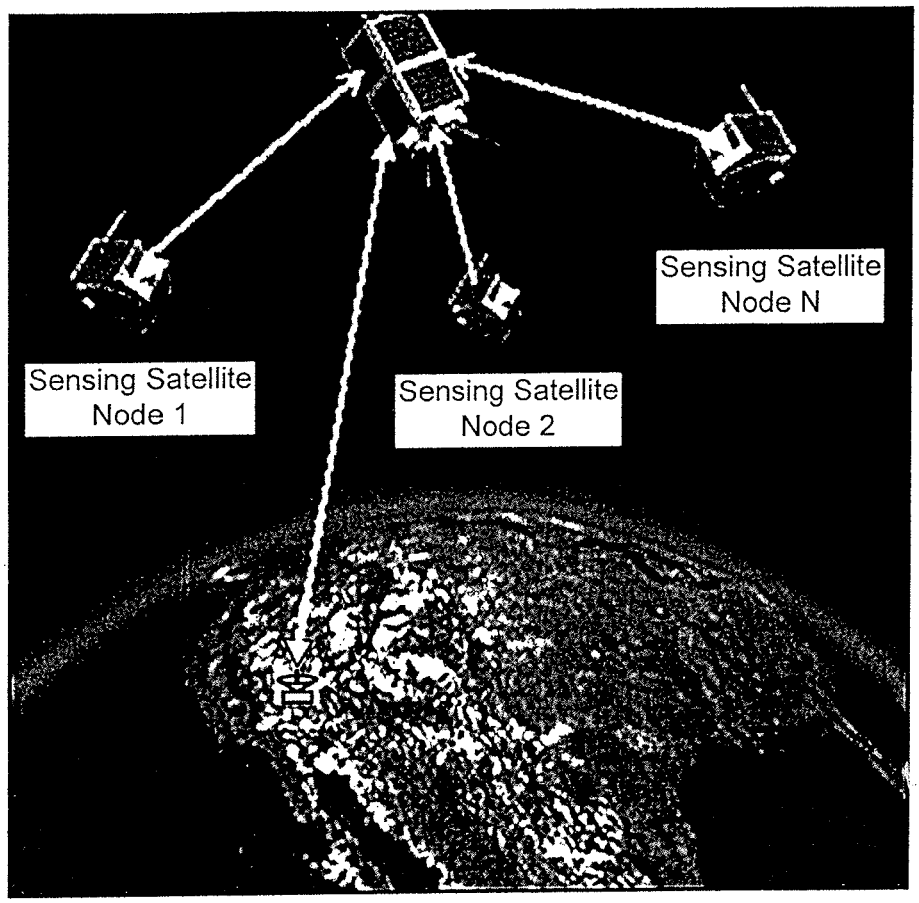
FIG. 1 is a schematic diagram of a satellite communication network.

The proposed system could be used as illustrated with FIG. 1, within which different sensory satellite nodes form a system that is responsible to collect data for space/earth observation and communicate directly with the main satellite. A receiver in the satellite in turn collects the data and sends it directly to ground station (or other station in the system). If the proposed system is installed on the main satellite, it will replace several antenna elements and a processing unit, which will result in compact, lighter weight and rapid data processing. The reconfigurable antenna is able to replace several sets of antennas, each designed at specific bandwidth and resonance frequency. Hence with a tunable antenna, one can have a more compact system, reduce interference, and reduce cross talk more efficiently.

Figure 2A:
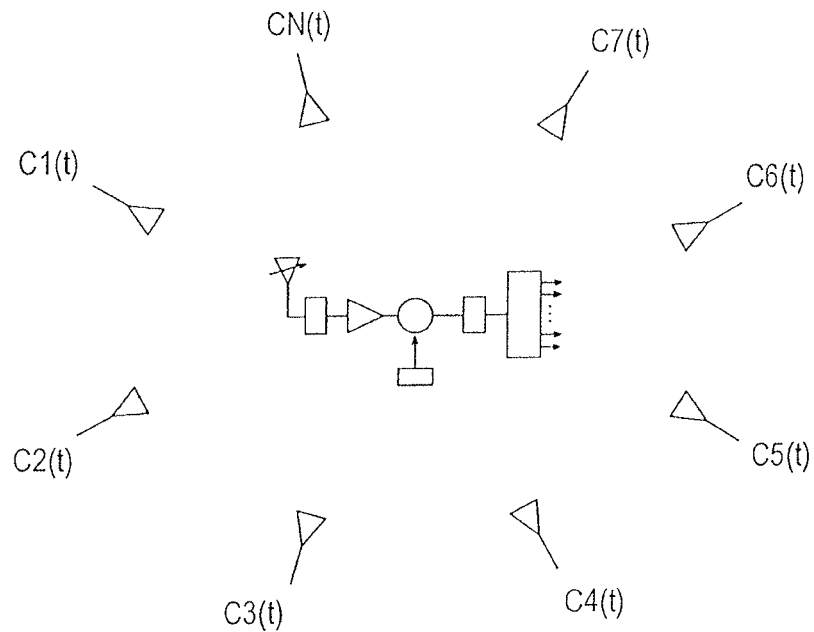
FIG. 2A is a block diagram of a network having a plurality of stations transmitting separate signals on fixed frequency band antennas and a central station having a tunable antenna and circuitry for multiplexing signals received from the stations having fixed frequency band antennas.
Figure 2B:
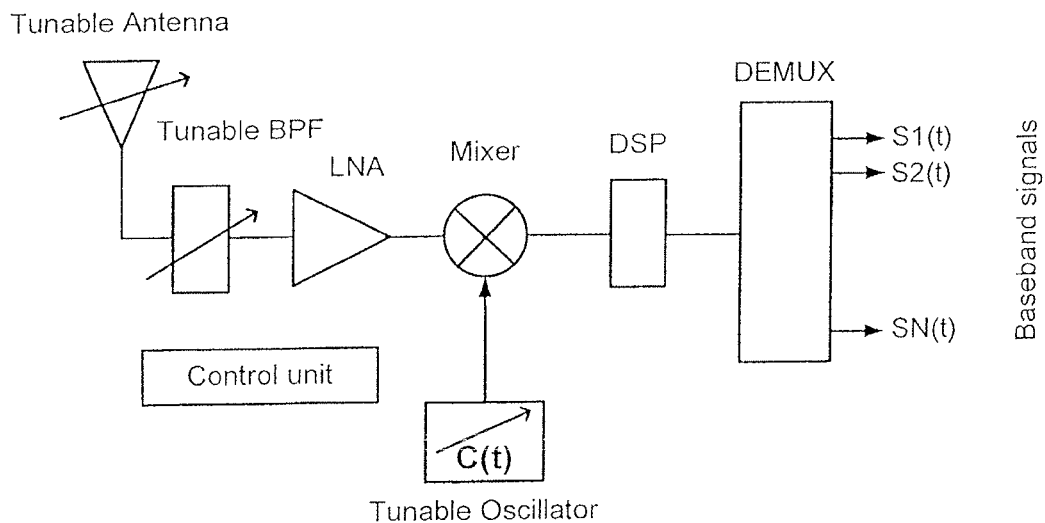
FIG. 2B is a block diagram showing further details of the configuration of the central station of FIG. 2A.

FIGS. 2A and 2B are block diagrams showing a circuit and system architecture for communicating with multiple stations, in which the circuit and system architecture provide for wireless multiplexing using a tunable antenna. FIG. 2A depicts several antenna elements transmitting several base signals on different carriers on different frequencies. The detailed system is shown in FIG. 2B. The system can be used with a variety of communication networks using multiple wireless stations, for example, the satellite communications network as depicted in FIG. 1, in which antenna selectivity of received stations can be reliably achieved.

The tunable antenna can have its frequency characteristics switched by applying a tuning action, such as voltage or mechanical tuning. Alternatively, switching of circuits can be used to either directly change the resonance of the antenna or to change a voltage applied to a voltage-controlled tuning circuit for the antenna. The switching of frequency characteristics can be used to provide a multiplexing function for the purpose of collecting signals from different surrounding antennas. Each signal operates at fixed frequency (or set of frequencies). A set of antennas operating at different frequency communication links or frequency bands are used to transmit data (for example sensory data) in the space. In such an arrangement, there is a need to collect all or some of the transmitted signals for processing in a single receiving device. The tunable antenna can be used to capture such signals from the space by switching its frequency characteristics frequently with high speed to cover the wide spectrum of antennas and a corresponding wide spectrum of communication links.

FIG. 2A depicts several antenna elements transmitting several base signal Si (t), S2(t), . . . , SN(t) modulated on carriers C1(t), C2(t), . . . , CN(t). The tunable receiving antenna characteristics can be switched to receive from a specific antenna by adjusting its resonant frequency to be identical to the transmitted antenna communication link frequency. To scan the whole antenna set and receive their corresponding transmitted information, the tuning speed of the antenna can be adjusted evenly to receive and recover the data simultaneously and instantaneously. Referring to FIG. 2B, a matching circuit is used to optimize the mismatch between the antenna intrinsic input impedance and the impedance of a tunable bandpass filter. The bandpass filter is used to filter out the unwanted harmonics and to minimize the interference signals. A low noise amplifier (LNA) is used to maximize the signal-to-noise ratio (SNR), as is common in antenna circuits. The received signals are then demodulated to recover the modulated baseband signal through the help of a tunable oscillator. The tunable antenna, filter and oscillator are all controlled by a control unit, which is responsible to synchronize and trigger all of them to the same frequency operation. After the multiplexing process, the output signal is processed in accordance with the desired modulation protocol, and other signal specifications. An information baseband signal can be extracted and separated using the de-multiplexing unit to recover the original data.

The proposed system may be used as illustrated with FIG. 1, within which different sensory satellite nodes are responsible to collect data for space/earth observation and communicate directly with the main satellite, which, in turn, collects the data and sends it directly to a ground station. If the proposed system is installed on the main satellite, it will replace several antenna elements and processing units, resulting in a compact, lighter weight design and can achieve rapid data processing.

A tunable antenna can have its frequency characteristics switched by applying a tuning action, such as voltage or mechanical tuning, and can be used to operate as a multiplexing device that can collect signals from different surrounding antennas, each operating at defined or predetermined frequency. For example, a set of stations may operate at different communication frequencies as different communication channels or function to increase data bandwidth (for example, sensory data). By multiplexing the signals, all or some of the data may receive common processing within a single central device. The tunable antenna can be used to capture such signals from the space by switching its frequency characteristics frequently with high speed to cover antennas associated with a correspondingly wide spectrum of frequencies to separately establish communication links with the subsets of one or more stations.

The tunable antenna characteristics can be switched to communicate with a specific station by adjusting its resonant frequency to be identical to the station's communication link frequency. To scan the whole station set or antenna set and communicate with the stations, the tuning speed of the antenna can be adjusted evenly to receive and recover the data simultaneously and instantaneously. A matching circuit may be required to optimize the match between the antenna intrinsic input impedance and the impedance of the tunable bandpass filter. The bandpass filter is used to filter out unwanted harmonics and to minimize interference signals. The LNA is used to maximize the signal-to-noise ratio (SNR).

In the receiver mode, the received signals are demodulated to recover the modulated baseband signal through the help of a tunable oscillator. The tunable antenna, filter and oscillator are all controlled by a control unit, which is responsible for synchronizing and triggering all of them to the same frequency operation. After the multiplexing process, the output signal is processed in accordance with the modulation protocol and other signal protocols being used for the transmission. The data or other information from the baseband signal can be extracted and separated using the de-multiplexing unit to recover the original data.

Figure 3:
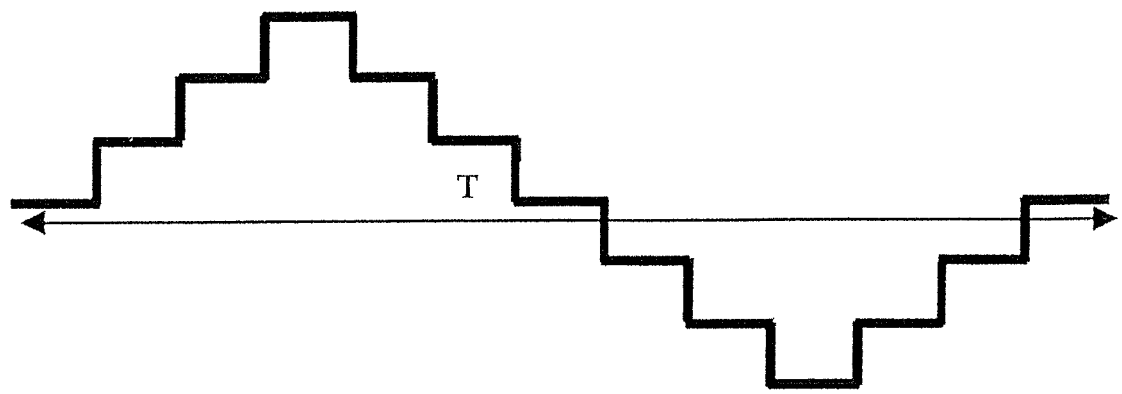
FIG. 3 is a waveform diagram that shows a sinusoidal signal of period T (e.g., produced by a voltage-controlled oscillator) after being digitized or converted to a square wave signal (e.g., by an analog-to-digital converter) for use as a DC bias voltage for switching the tunable antenna.
Figure 4:
FIG. 4 is a waveform diagram showing the square wave signal of FIG. 3 after rectification (e.g., by a bridge rectifier) to form a positive voltage square wave signal of period T/2.
Figure 5:
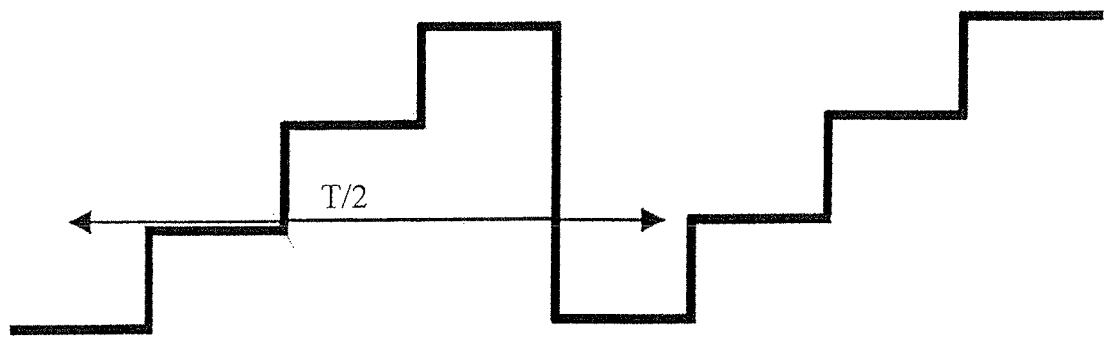
FIG. 5 is a waveform diagram showing the square wave signal of FIG. 3 after rectifying the signal and quantizing the voltage to obtain a stepped square wave signal similar to a saw-tooth signal.

FIGS. 3-5 are waveform diagrams showing a stepped sine wave signal that has been digitized and converted to a square wave signal to switch the tunable amplifier to different resonant frequencies. FIG. 3 shows a stepped sine wave signal. FIG. 4 shows a bridge rectifier output of the stepped sine wave signal of FIG. 3. FIG. 5 shows a stepped sine wave signal generated to increase through a full cycle.

To produce a DC bias signal, a voltage-controlled oscillator (VCO) is used. The VCO provides a sinusoidal signal, with a period T. To make the signal suitable for usage in DC biasing, an analog-digital converter (ADC) is used to output a signal that has the same shape of the sinusoidal signal but with step voltage levels as shown in FIG. 3. The step voltage levels are therefore established as a multi-level DC bias signal, used to switch the resonant frequency states, and thereby change the antenna's resonant frequency. The bias allows a voltage-controlled tuning circuit responsive to a bias signal to tune the tunable antenna. The tunable antenna provides for wireless multiplexing.

The antenna can be tuned using several tuning mechanisms, such as a barium strontium titanate (BST) capacitor, a Micro-Electro-Mechanical System (MEMS), a liquid crystal, piezoelectric, or other semiconductor circuit. In specific antenna structures, the application of DC voltage can be used to change the capacitance coupling between two lines, or to change the value of a varactor diode or the capacitance value of a BST capacitor.

In the case of a BST capacitor with tunable dielectric materials being used for tuning, the dielectric constant value of the BST capacitor can be changed due to the polarization of material domains that can be controlled using a DC bias voltage. The resonant frequency is tuned when the capacitance is tuned, based on a biasing-frequency relationship:

$$f = \frac{1}{2\pi\sqrt{LC}}.$$

There are several antenna circuits known in the art that are tuned using BST capacitors, varactors, MEMS, liquid crystal, and piezoelectric circuits or devices.

Each step in the ladder-like sine signal represents a shift in DC bias voltage. At least two approaches may be used to implement the quantized sine signal. In a first approach, a bridge rectifier is used at the output of the ADC and makes all the steps positive along the period T as shown in FIG. 4. As a result, the period of the rectified signal will be T/2. As a second, alternate approach, a saw-tooth signal is generated and quantized. When the voltage reaches the maximum value, it will go back to the first DC voltage value as shown in FIG. 5.

The two approaches have different behaviors. If the system needs to listen to four different frequencies, the first method will listen in order, then as the voltage descends, it will listen in reverse order such as:

0→f1→f2→f3→f2→f1→f0

In the second approach, the system will listen to the frequencies in order, then it will loop back and listen again such as:

0→f1→f2→f3→f0

The first method has a disadvantage in which f1 will be read less frequently than f3. This could make the system unbalanced, since it will listen to an external data source more frequently than other data sources.

Figure 6:
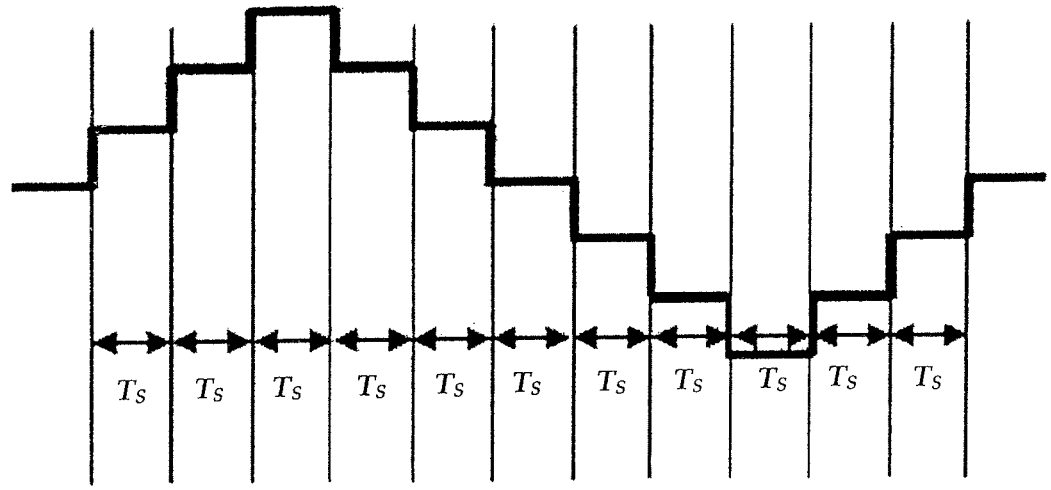
FIG. 6 is a waveform diagram showing a square wave signal divided into sampling times $T_s$, e.g., by an analog-to-digital converter.
Figure 7:
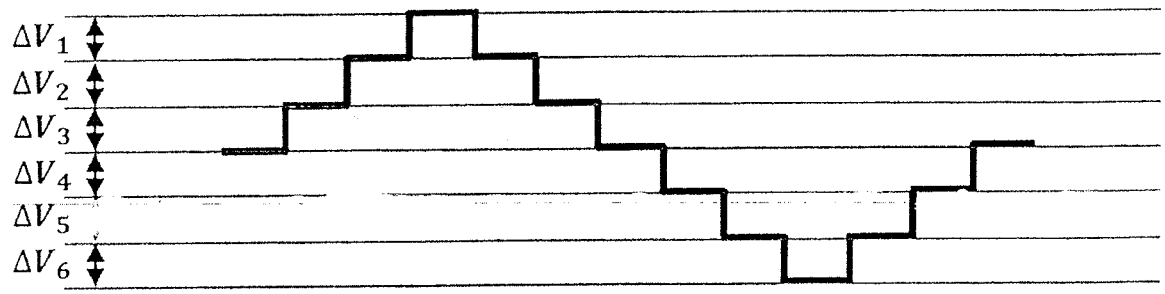
FIG. 7 is a waveform diagram showing quantization of the voltage levels of a square wave signal.

FIGS. 6 and 7 are waveform diagrams showing the control of the sine wave signals of FIGS. 3-5. In the embodiment shown, the ADC provides the required stepped behavior, although it will be understood that other circuitry may be used to produce the same or similar waveforms. The quantization time $T_s$ is the time each DC value will stay before it is changed. The sampling time can be controlled and is equal to all the resultant DC values, as shown in FIG. 6. In addition, the ADC will provide control of the position of each quantization and how far it's from the reference voltage. It is possible to control $\Delta V x$ as desired to match DC voltage needs, as shown in FIG. 7.

Figure 8:
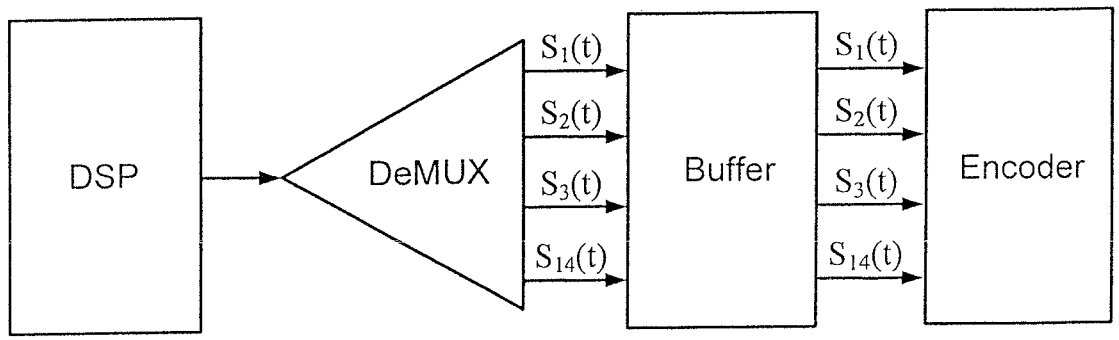
FIG. 8 is a block diagram of a de-multiplexing circuit for separating the multiplexed signals for re-transmission to their ultimate destination.

FIG. 8 is a block diagram showing a de-multiplexing circuit. Design considerations include fast switching times, in order to provide a compact system, reduce interference, and reduce cross talk, and provide more efficient data transfer. After the digital signal processing elements, a de-multiplexer chip will provide different lanes for the filtered signal for buffering, as shown in FIG. 8. When the buffer is filled with signals from all the signal sources, the system will encode the signal and prepare it for transmission to the ground station. Different encoding methods could be employed, such as CDMA.

It will be understood that many additional changes in the details, materials, steps and arrangement of parts, which have been herein described and illustrated to explain the nature of the subject matter, may be made by those skilled in the art within the principle and scope of the disclosure, as expressed in the appended claims.

It is to be understood that the wireless multiplexing using tunable antenna is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A communications network for wireless multiplexing using a tunable antenna for radio frequency communications, comprising:
    a plurality of node stations having transmitters configured for transmitting original signals to a central station, each of the plurality of node stations transmitting on a predetermined and distinct carrier frequency; and
    a central station consisting of:
        a tunable antenna capable of being tuned to all of the predetermined and distinct carrier frequencies used by the node stations;
        an antenna switching circuit, the antenna switching circuit includes a control circuit connected to the tunable antenna for switching the tunable antenna to be resonant alternately at the predetermined and distinct carrier frequencies used by the node stations for a corresponding sample time interval, wherein the applied tuning action acts to collect the signals and frequencies for wireless multiplexing; and
        a de-multiplexer circuit for splitting the multiplexed signal to recover the signals transmitted by the node stations for retransmission of the transmitted signals.

2. The communications network according to claim 1, wherein said antenna switching circuit comprises:
    a voltage-controlled switching element;
    a voltage-controlled oscillator having a sine wave output; and
    an analog-to-digital converter connected to the sine wave output of the voltage-controlled oscillator, the analog-to-digital converter being configured for converting the sine wave output into a square wave switching signal connected to the voltage-controlled switching element.

3. The communications network according to claim 1, wherein the antenna switching control circuit further comprises:
    a tunable bandpass filter tuned to attenuate or control harmonics and unwanted signals; and
    an impedance matching circuit having a tuning capability to optimize impedance match between an intrinsic impedance of the antenna and an impedance of the tunable bandpass filter.

4. A method for signal multiplexing different signals received from a plurality of node stations, comprising the steps of:
    providing a central station consisting of:
        a tunable antenna capable of being tuned to all of the different predetermined and distinct carrier frequencies used by the node stations;
        an antenna switching circuit, the antenna switching circuit includes a control circuit connected to the tunable antenna for switching the tunable antenna to be resonant alternately at the different predetermined and distinct carrier frequencies used by the node stations for a corresponding sample time interval, wherein the applied tuning action acts to collect the signals and frequencies for wireless multiplexing; and
        a de-multiplexer circuit for splitting the multiplexed signal to recover the signals transmitted by the node stations for retransmission of the transmitted signals;
    controlling the tuning of the tunable antenna to select different resonant frequencies as antenna tuned frequencies; and
    providing signal selection to communicate signals selected in accordance with the antenna tuned frequencies, the selection of the signals providing multiplexing;
    using the tunable antenna to communicate with the node stations operating as different frequency communication links by using the signal selection to selectively communicate with subsets of the set of stations;
    using the selective communication with the selected node stations to communicate signals separately with each of the selected node stations; and
    using the tunable antenna used to communicate signals to the subsets of the set of stations by switching frequency characteristics of the tunable antenna to cover a wide spectrum of frequencies to separately establish communication links with the selected node stations.

5. The method for signal multiplexing according to claim 4, further comprising the steps of:
    using the tunable antenna to switch the antenna characteristics to communicate with a specific node station by adjusting its resonance frequency identical to the station's communication link frequency; and in scanning a set of stations, adjusting a tuning speed of the antenna to provides even adjustment to receive and recover the data in a multiplexed manner.

6. The method for signal multiplexing according to claim 5, further comprising the step of using a tunable bandpass filter to filter out unwanted harmonics and to minimize interference signals.

\* \* \* \* \*